(12) United States Patent
Abe et al.

(10) Patent No.: US 10,224,763 B2
(45) Date of Patent: Mar. 5, 2019

(54) WIRELESS POWER RECEIVING DEVICE, RECEIVER CIRCUIT THEREOF, AND CONTROL METHOD OF WIRELESS POWER RECEIVING DEVICE

(71) Applicant: ROHM CO., LTD., Ukyo-ku, Kyoto (JP)

(72) Inventors: Shinichi Abe, Kyoto (JP); Tatsuya Iwasaki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 348 days.

(21) Appl. No.: 14/799,064

(22) Filed: Jul. 14, 2015

(65) Prior Publication Data

US 2016/0020643 A1 Jan. 21, 2016

(30) Foreign Application Priority Data

Jul. 17, 2014 (JP) .................. 2014-147172

(51) Int. Cl.
*H02J 7/00* (2006.01)
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC ..... B60L 11/182; B60L 11/1829; H02J 50/10; H02J 50/05
USPC .......................................... 320/108; 307/104
See application file for complete search history.

(56) References Cited

U.S. PATENT DOCUMENTS

| | | | |
|---|---|---|---|
| 2009/0278505 A1* | 11/2009 | Toya ................... | H01M 10/052 320/152 |
| 2009/0309502 A1* | 12/2009 | Trattler .............. | H05B 33/0818 315/160 |
| 2013/0069585 A1* | 3/2013 | Kamata ................. | H02J 5/005 320/108 |
| 2013/0200843 A1* | 8/2013 | Tanabe .................. | H02J 7/0042 320/108 |

FOREIGN PATENT DOCUMENTS

JP 2013230079 A 11/2013

* cited by examiner

*Primary Examiner* — Zixuan Zhou
(74) *Attorney, Agent, or Firm* — Cantor Colburn LLP

(57) ABSTRACT

The wireless power receiving device includes a receiving antenna, a rectifier circuit connected to the receiving antenna, that generates a rectified voltage, a charging circuit to receive the rectified voltage and charge a power storage device, and a modulator that modulates a voltage or current of the receiving antenna by changing a charging current of the charging circuit based on data to be transmitted to a wireless power transmitting device.

6 Claims, 9 Drawing Sheets

WIRELESS POWER RECEIVING DEVICE, RECEIVER CIRCUIT THEREOF, AND CONTROL METHOD OF WIRELESS POWER RECEIVING DEVICE

CROSS-REFERENCE TO RELATED APPLICATION

The present invention claims priority under 35 U.S.C. § 119 to Japanese Application No. 2014-147172, filed on Jul. 17, 2014, the entire content of which is incorporated herein by reference.

TECHNICAL FIELD

The present disclosure relates to wireless power feeding technology.

BACKGROUND

Recently, a non-contact power transfer (contactless power feeding, also referred to as wireless power feeding) for supplying electronic devices with electric power began to be widely spread. In order to improve interoperability between the products of different manufacturers, the WPC (Wireless Power Consortium) was organized. The WPC has developed a Qi (Chi) standard, which is an international standard.

FIG. 1 is a diagram showing the configuration of a wireless power feeding system 100 according to the Qi standard. The power feeding system 100 is equipped with a power transmitting device 200, such as a TX, a power transmitter, etc., and a power receiving device 300, such as a RX, a power receiver, etc. The power receiving device 300 is mounted in electronic devices such as a cell-phone terminal, a smart phone, an audio player, a gaming device, a tablet terminal, etc.

The power transmitting device 200 has a transmitting antenna 201, a driver 204, a controller 206, and a demodulator 208. The transmitting antenna 201 includes a transmitting coil (e.g., a primary coil) 202 and a resonant capacitor 203. The driver 204 includes an H bridge circuit (e.g., a full-bridge circuit) or a half-bridge circuit. The driver 204 applies a driving signal S1, specifically, a pulse signal, to the transmitting coil 202 and generates a power signal S2 of the electromagnetic field in the transmitting coil 202 by allowing the driving current flow through the transmitting coil 202. The controller 206 is used to control the entire power transmitting device 200. Specifically, the controller 206 changes the transmitting power by controlling the switching frequency of the driver 204 or the duty cycle of switching.

According to the Qi standard, a communications protocol between the power transmitting device 200 and the power receiving device 300 has been defined and it is possible to transmit control data S3 from the power receiving device 300 to the power transmitting device 200. This control data S3 is a type modulated by Amplitude-Modulation (AM) modulated data by using a backscatter modulation and is transmitted from a receiving coil 302, such as a secondary coil, to a transmitting coil 202. For example, this control data S3 may include power control data (also referred to as a packet) indicative of the amount of electric power supplied for the power receiving device 300, data indicative of unique information of the power receiving device 300, etc. The demodulator 208 demodulates control data S3 included in the current or voltage of the transmitting coil 202. The controller 206 controls the driver 204 based on power control data included in the demodulated control data S3.

The power receiving device 300 has a receiving coil 302, a rectifier circuit 304, a capacitor 306, a modulator 308, a secondary battery 310, a controller 312, and a charging circuit 314. The receiving coil 302 may receive a power signal S2 from the transmitting coil 202 and transmit control data S3 to the transmitting coil 202. Both the rectifier circuit 304 and capacitor 306 rectify and smooth a current S4, which is induced in the receiving coil 302 based on the power signal S2, and convert it to a DC voltage.

The charging circuit 314 charges the secondary battery 310 using power supplied from the power transmitting device 200.

The controller 312 monitors the amount of power supply that the power receiving device 300 is receiving, and generates the power control data (e.g., control error value) indicative of the amount of power supply based on the monitored amount of power supply. The modulator 308 modulates the control data S3 containing power control data. In addition, the modulator 308 modulates a coil current and a coil voltage in the transmitting coil 202 by modulating the coil current flowing through the receiving coil 302.

The power feeding system 100 is configured as mentioned above.

FIGS. 2A and 2B show circuit diagrams of the modulator 308 that the present inventors have studied. The receiving antenna 301 includes a receiving coil 302 and a resonant capacitor 303 that are connected in series to each other. The modulator 308 of FIG. 2A includes capacitors C1, C2, switches SW1, SW2 and a resistor R1. When turning on the switches SW1, SW2, a parallel resonance frequency is shifted as compared to that of an off state, thereby obtaining a modulation depth for AM communications. In this manner, the AM modulation can be performed.

The modulator 308 of FIG. 2B includes a switch SW3 and a resistor R3 that are connected in series between the output of the rectifier circuit 304 and the ground. When turning on the switch SW3, a current from the output of the rectifier circuit 304 is flowing to the ground, thereby obtaining the modulation depth for AM communications.

The present inventors have studied the modulator 308 of FIGS. 2A and 2B and have perceived the following problems.

FIG. 3 is a diagram showing the frequency characteristics of the modulator 308 of FIG. 2A. An f1 indicates a series resonance frequency and an f2 indicates a parallel resonance frequency. According to on/off states of the switches SW1, SW2, the parallel resonance frequency f2 may be shifted. In this case, since a modulation depth becomes zero at the cross-point of the two frequency characteristics, this may cause the communication to become unstable if the frequency of the data communications is located in the vicinity of the cross-point.

Additionally, in the case of using the modulator 308 of FIG. 2B, since a portion of the received power is flowing to ground after passing through the switch SW3 and the resistor R3, this may cause a decrease in efficiency and/or heat generation.

SUMMARY

The present disclosure provides a wireless power receiving device to induce a current component according to data in the receiving antenna by changing the charging current, thereby transmitting an AM modulated signal to the wireless power transmitting device. Also, the present disclosure provides a wireless power receiving device to induce a current component according to data in the receiving antenna by changing a current flowing into the load, thereby transmitting the AM-modulated signal to the wireless power transmitting device.

According to one embodiment of the present disclosure, there is provided a wireless power receiving device. The wireless power receiving device includes a receiving antenna, a rectifier circuit connected to the receiving antenna, that generates a rectified voltage, a charging circuit to receive the rectified voltage and charge a power storage device, and a modulator that modulates a voltage or current of the receiving antenna by changing a charging current of the charging circuit based on data to be transmitted to a wireless power transmitting device.

According to this embodiment, it is possible to induce a current component according to data in the receiving antenna by changing the charging current, thereby transmitting an AM modulated signal to the wireless power transmitting device. According to this, it is possible to obtain a stable degree of modulation without depending on the frequency and/or limit a decrease in efficiency since the charging current is recovered to the battery.

In some embodiments, the charging circuit is capable of switching between the charging current with a first current amount and the charging current with a second current amount.

In some embodiments, the charging circuit may include a first current source for normally supplying a battery with a first current amount and a second current source for supplying the battery with a differential current between the first current amount and the second current amount to be capable of being in an on state or off state according to the data.

According to another embodiment of the present disclosure, there is provided a wireless power receiving device. The wireless power receiving device includes a receiving antenna, a rectifier circuit connected to the receiving antenna, that generates a rectified voltage, and a modulator that modulates a voltage or current of the receiving antenna by changing the current based on data to be transmitted to a wireless power transmitting device, the modulator being provided on a path of a current flowing from the rectifier circuit into a load.

According to this embodiment, it is possible to induce a current component according to data in the receiving antenna by changing a current flowing into the load, thereby transmitting the AM-modulated signal to the wireless power transmitting device. According to this, it is possible to obtain a stable degree of modulation without depending on the frequency and/or limit a decrease in efficiency since the variation component of the current is supplied to the load without loss.

In some embodiments, the wireless power receiving device may comply with a Qi standard.

According to another embodiment of the present disclosure, there is provided a receiver circuit. The receiver circuit is for use in a wireless power receiving device together with a receiving antenna. The receiver circuit includes a rectifier circuit connected to the receiving antenna, that generates a rectified voltage, a charging circuit to receive the rectified voltage and charge a power storage device, and a modulator that modulates a voltage or current of the receiving antenna by changing a charging current of the charging circuit based on data to be transmitted to a wireless power transmitting device.

In some embodiments, the charging circuit is capable of switching between the charging current with a first current amount and the charging current with a second current amount.

In some embodiments, the charging circuit may include a first current source for normally supplying a battery with a first current amount and a second current source for supplying the battery with a differential current between the first current amount and the second current amount to be capable of being in an on state or off state according to the data.

According to another embodiment of the present disclosure, there is provided a receiver circuit. The receiver circuit is for use in a wireless power receiving device together with a receiving antenna. The receiver circuit includes a rectifier circuit connected to the receiving antenna, that generates a rectified voltage, and a modulator that modulates a voltage or current of the receiving antenna by changing an electric current based on data to be transmitted to a wireless power transmitting device, the modulator being provided on a path of a current flowing from the rectifier circuit into a load.

In some embodiments, the receiver circuit may comply with the Qi standard.

In some embodiments, the receiver circuit may be integrated on a single semiconductor substrate. As used herein, the term "integrated" is intended to include both of a case where all elements of a circuit are formed on a semiconductor substrate and a case where main elements of the circuit are integrated on the semiconductor substrate. In addition, some resistors, capacitors, etc. for adjustment of a circuit constant may be provided outside the semiconductor substrate. By integrating the circuit as a single chip, it is possible to reduce a circuit area and uniformly maintain characteristics of circuit elements.

Furthermore, arbitrary combinations of the constituent elements and conversions of the expression of the present disclosure between methods, devices, and systems are also effective as aspects of the present disclosure.

DETAILED DESCRIPTION

Figure 1:
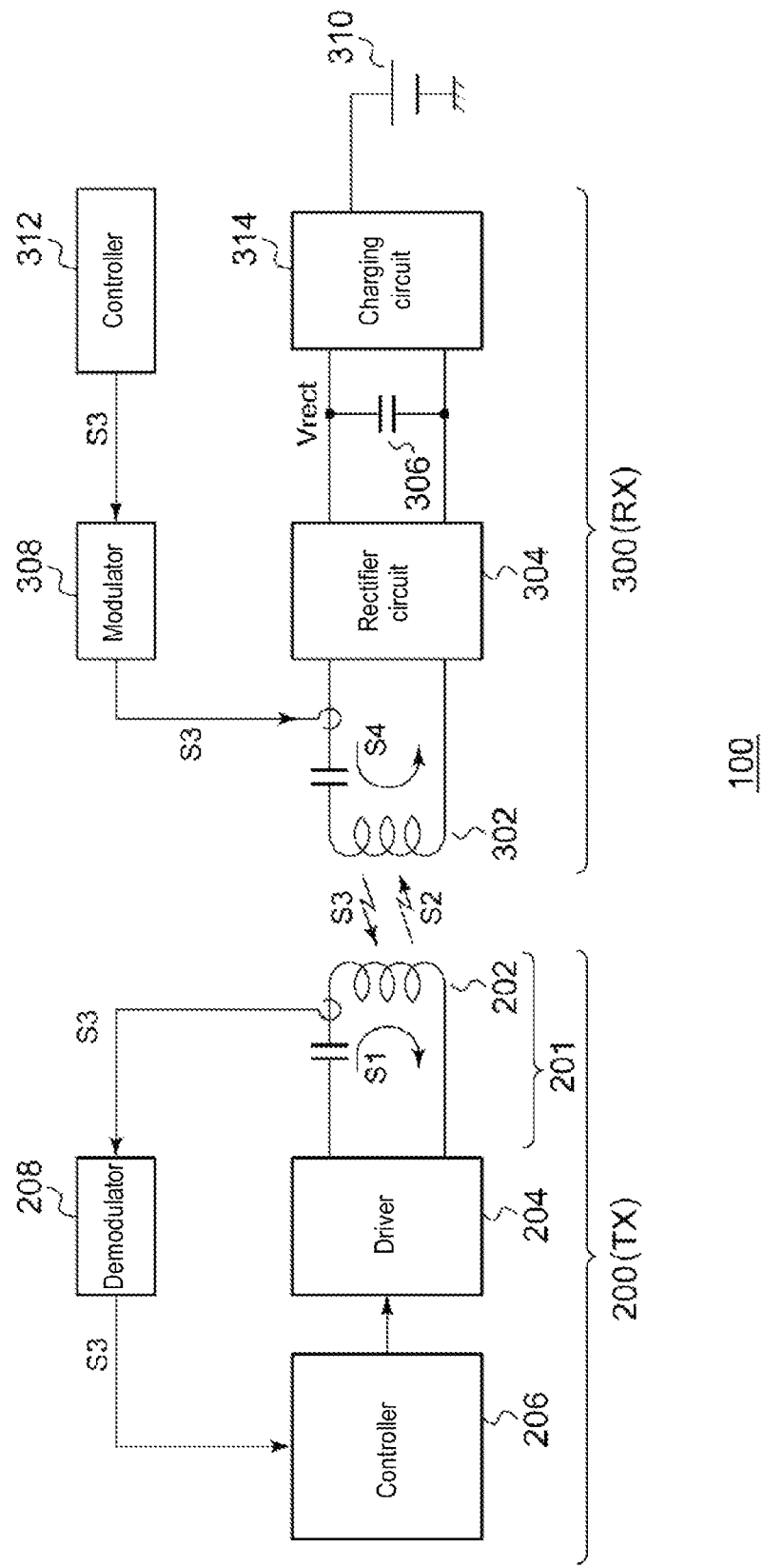
FIG. 1 is a diagram showing the configuration of a wireless power feeding system according to the Qi standard.
Figure 2A:
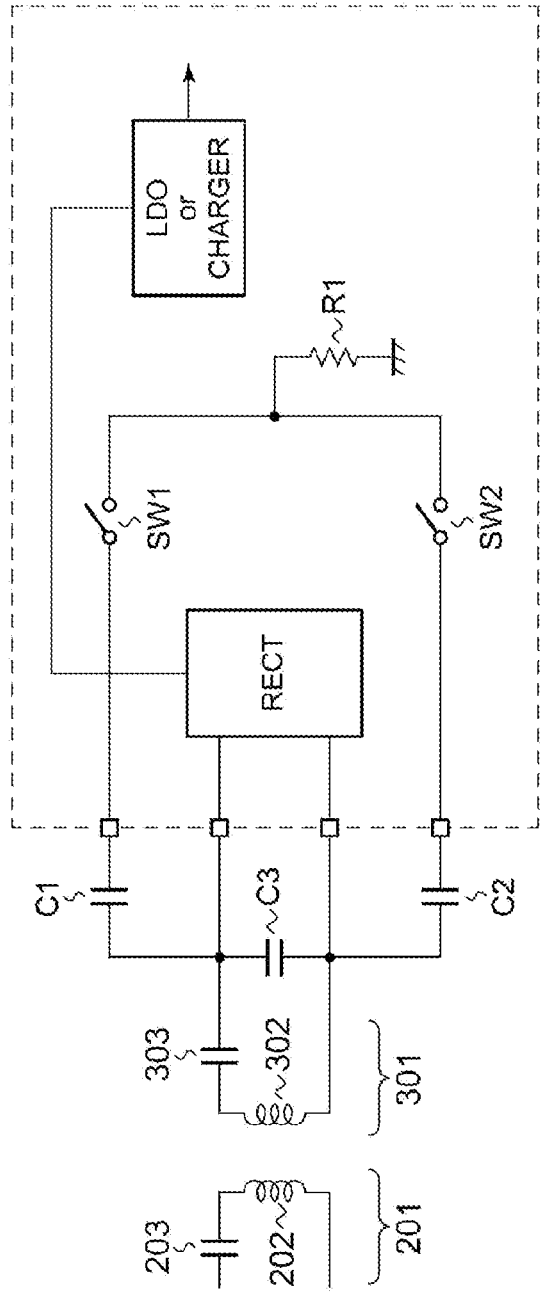
FIGS. 2A and 2B show the circuit diagrams of the modulators that the present inventors have studied.
Figure 2B:
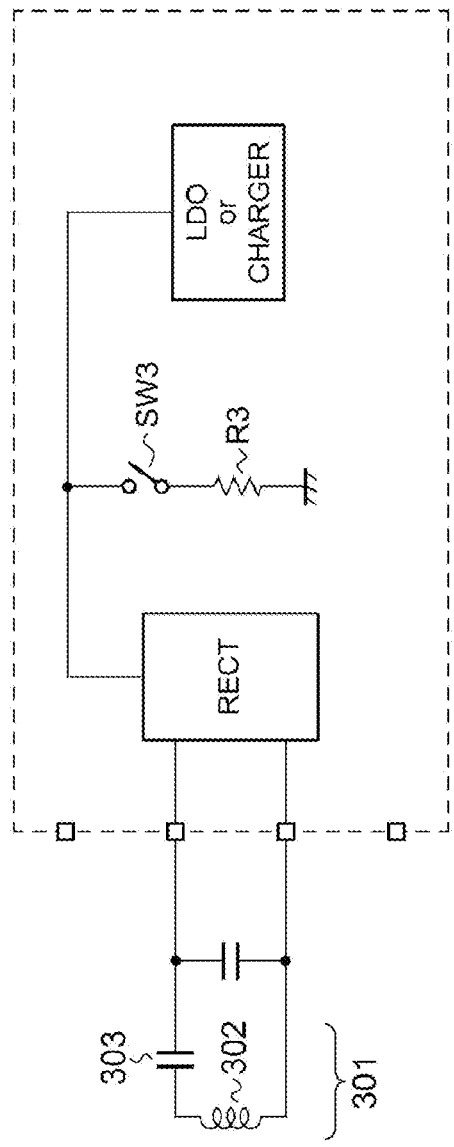
Figure 3:
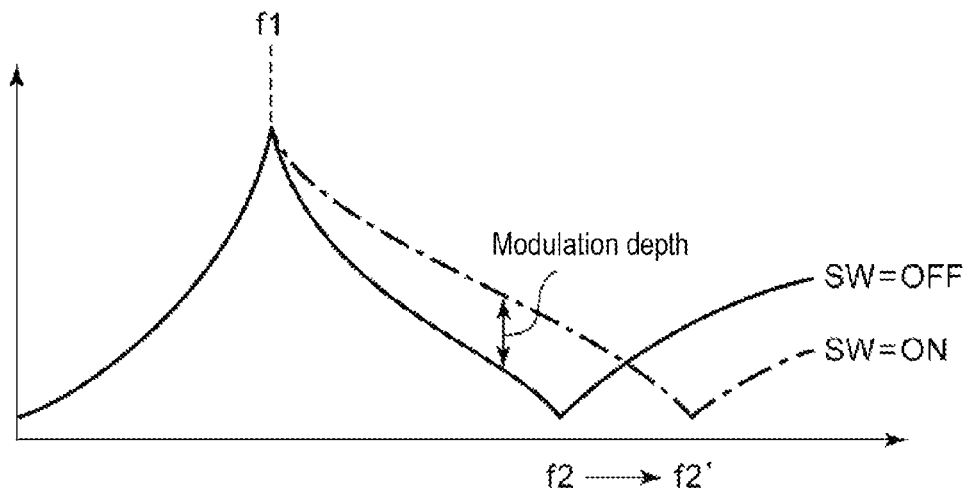
FIG. 3 is a diagram showing the frequency characteristics of the modulator of FIG. 2A.

Various embodiments of the present disclosure will be described below in detail with reference to the accompanying drawings. Throughout the drawings, the same or similar elements, members, and processes are denoted by the same reference numerals and redundant descriptions thereof may be omitted. The disclosed embodiments are not limited to the present disclosure, and are provided for the purpose of illustration, and all features and combinations thereof described in the embodiments should not be necessarily construed as describing the gist of the present disclosure.

As used herein, the expression "a member A is connected with a member B" may mean that member A is physically and directly connected to member B, or that member A is connected to member B via another member without substantially affect the electrical connection or without harming the functionality or effects that may be achieved by the connection.

Similarly, the expression "a member C is interposed between a member A and a member B" may indicate that the member A is directly connected to the member C or the member B is directly connected to the member C, and that the members are indirectly connected via another member without substantially affect the electrical connection or without harming the functionality or effects that may be achieved by the connections.

Figure 4:
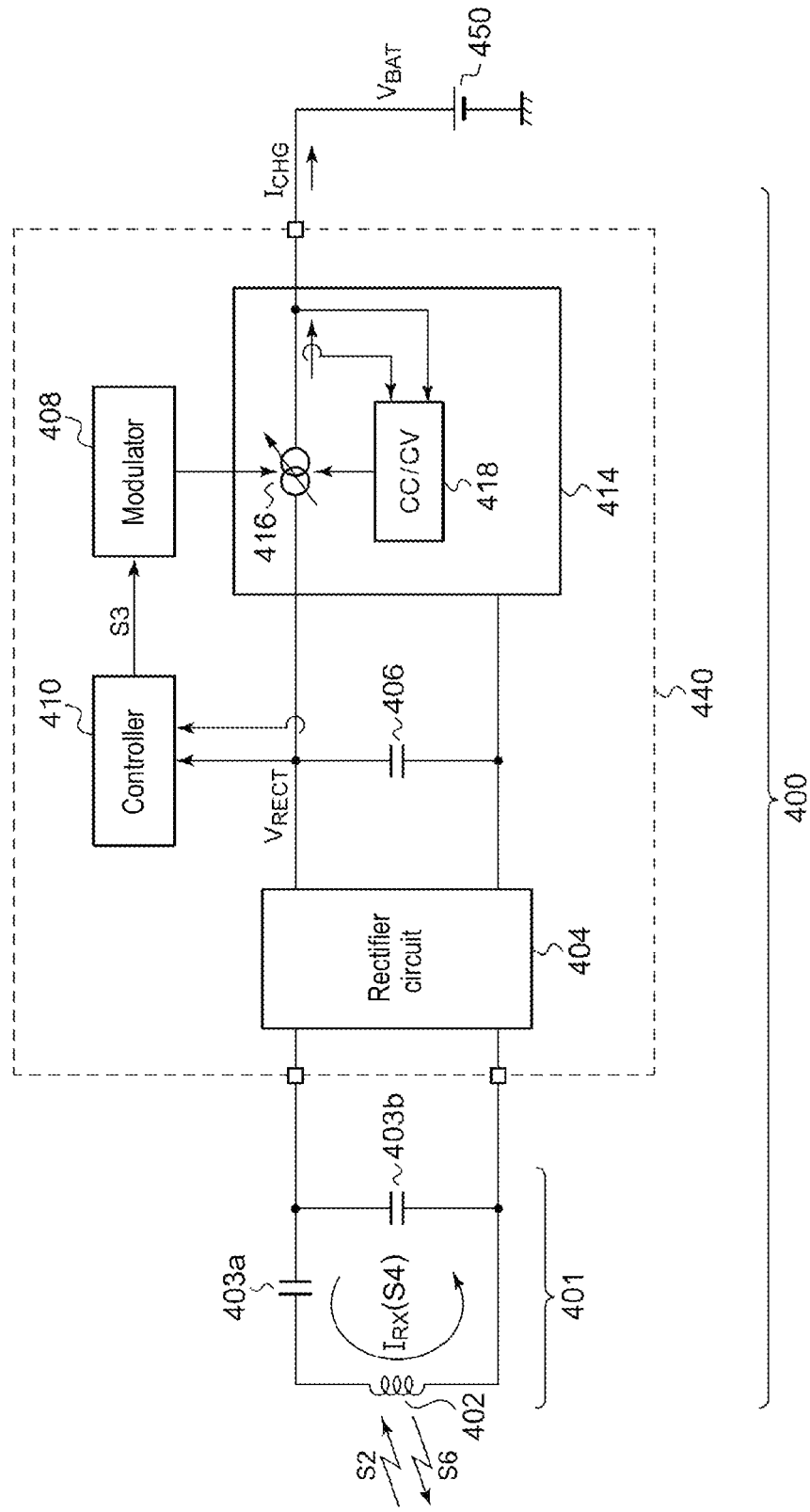
FIG. 4 is a circuit diagram showing the configuration of a wireless power receiving device according to an embodiment of the present disclosure.

FIG. 4 is a circuit diagram showing the configuration of a wireless power receiving device 400 (hereinafter, simply referred to as the power receiving device) according to one embodiment of the present disclosure. The power receiving device 400 can be substituted for the power receiving device 300 equipped in the power feeding system 100, as shown in FIG. 1, which may comply with the Qi standard.

In this embodiment, the power receiving device 400 is configured to receive a power signal S2 from the power transmitting device 200 (not shown) capable of charging a power storage device 450 using the received power. The power storage device 450 may be a secondary battery such as a lithium ion battery, nickel-hydrogen battery, etc. In addition, the power storage device 450 may be a capacitor.

The power receiving device 400 includes a receiving antenna 401 and a receiver circuit 440. The receiving antenna 401 includes a receiving coil 402 and a resonant capacitor 403a which are connected in series to each other, and a resonant capacitor 403b which is connected in parallel to the receiving coil 402 and resonant capacitor 403a. In addition, the configuration of the receiving antenna 401 is not particularly limited.

The receiver circuit 440 is connected to the receiving antenna 401 and the power storage device 450. The receiver circuit 440 is configured to rectify and smooth an electric current induced in the receiving antenna 401 based on the power signal S2 and convert it to a direct voltage $V_{RECT}$, and be able to charge the power storage device 450 using the direct voltage $V_{RECT}$. In addition, the receiver circuit 440 has a function of modulating an electric current flowing through the receiving antenna 401 based on data to be transmitted to the power transmitting device 200 and transmitting data to the power transmitting device 200 by back-scattering. The receiver circuit 440 may be integrated as a functional chip on a single semiconductor substrate.

The receiver circuit 440 includes a rectifier circuit 404, a smoothing capacitor 406, a modulator 408, a controller 410, and a charging circuit 414.

The rectifier circuit 404 is connected to the receiving antenna 401 and generates a rectified voltage $V_{RECT}$. The rectifier circuit 404 may be a diode bridge circuit or a synchronous rectifier circuit. The smoothing capacitor 406 is connected to the output of the rectifier circuit 404 and smoothing of the rectified voltage $V_{RECT}$ is performed.

The charging circuit 414 receives the rectified voltage $V_{RECT}$ and charges the power storage device 450. Specifically, the charging circuit 414 is capable of charging the power storage device 450 in constant current (CC: Constant Current) mode or constant voltage (CV: Constant Voltage) mode depending on the range of voltage $V_{BAT}$ of the power storage device 450. The charging circuit 414 is configured to change the charging current $I_{CHG}$ supplied into the power storage device 450 to two-values or multi-values based on an adjusted current amount for the purpose of charging or in the vicinity thereof, or is configured to make the charging current $I_{CHG}$ change continuously within a certain range.

The charging circuit 414 includes a power source 416, which may operate as a constant current source in a CC mode or operate as a constant voltage source in a CV mode, and a charge controller 418 which controls the power source 416. The charge controller 418, in the CC mode, performs a feedback control so that a baseline (i.e., a mean level) of the charging current $I_{CHG}$, which the power source 416 generates, may come close to a target value. In addition, the charge controller 418, in the CV mode, adjusts the baseline (i.e., the mean level) of the charging current $I_{CHG}$ that the power source 416 generates, so that the battery voltage $V_{BAT}$ may come close to the target value.

The output current $I_{CHG}$ from the charging circuit 414 has changed in the vicinity of an adjusted current amount by charge controller 418.

The controller 410 controls the power receiving device 400 in whole in addition to the receiver circuit 440. For example, the controller 410 generates control data S3 to be transmitted to the power transmitting device 200 in appropriate timings so as to output it to the modulator 408. Control data S3 may be exemplified as (i) ID data transmitted to the power transmitting device 200 in an authentication phase, (ii) control error (CE) packet for controlling the transmitting power of the power transmitting device 200, and (iii) received power data indicative of a power PRX that a power receiving device 400 is currently receiving.

The CE packet is determined from the difference between the rectified voltage $V_{RECT}$ and the desired point (DP: Desired Point) that is a target level. Thus, the controller 410 has the functions of sensing the rectified voltage $V_{RECT}$ and calculating the difference between the rectified voltage $V_{RECT}$ and the DP. In addition, the controller 410 has the functions of sensing the current $I_{OUT}$ flowing through the charging circuit 414 and calculating a received power PRX by obtaining the product of the rectified voltage $V_{RECT}$ and the current $I_{OUT}$. In addition, the calculation formula of the received power RPX is not particularly limited and the calculating may be performed using any other methods.

The modulator 408 receives the control data S3 to be transmitted to the power transmitting device 200. The modulator 408 changes the charging current $I_{CHG}$, which is supplied to the power storage device 450 from the charging circuit 414, based on the control data S3. This causes the modulation component according to the control data S3 to be superimposed on a voltage or current of the receiving antenna 401 and then a signal according to the control data S3 will be radiated from the receiving antenna 401.

The power receiving device 400 is configured as described above. The operations of the power receiving device 400 will be described below.

Figure 5:
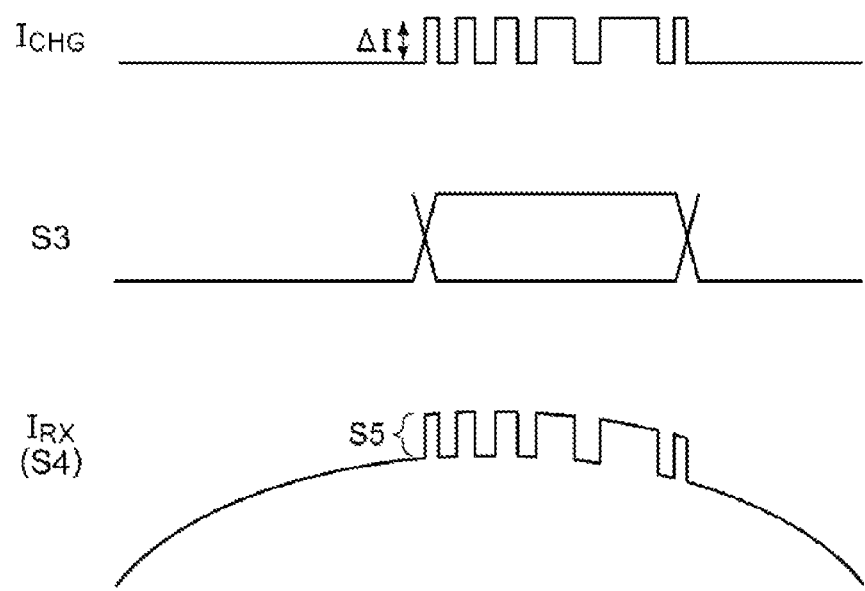
FIG. 5 is a waveform diagram showing operations of the power receiving device of FIG. 4.

FIG. 5 is a waveform diagram showing operations of the power receiving device 400 of FIG. 4. The charging circuit 414 generates a charging current $I_{CHG}$ that is adjusted by the charge controller 418. The modulator 408 receives control data S3 to be transmitted from the controller 410 to the power transmitting device 200 and performs amplitude-modulating of the charging current $I_{CHG}$, which is generated by the charging circuit 414, based on the control data S3. A received current IRX (S4) induced by the power signal S2 is flowing through the receiving antenna 401 and the modulation component S5 according to a variation of the charging current $I_{CHG}$ is superimposed on the received current IRX. Then, an electromagnetic field S6 according to the modulation component S5 is radiated from the receiving coil 402. In this manner, the control data S3 is transferred by the electromagnetic field S6.

As such, it is possible to induce a current component S5 based on the control data S3 in the receiving antenna 401 by changing the charging current $I_{CHG}$, thereby transmitting an AM modulated signal to the wireless power transmitting device. By using the power receiving device 400, it is possible to obtain a stable modulation degree without depending on frequency. In addition, since the charging current $I_{CHG}$ is to be recovered to the battery 450, a power loss by changing the charging current $I_{CHG}$ can substantially be avoided and it is possible to limit a decrease in efficiency of the power receiving device 400.

The present disclosure is intended to include all the embodiments which can be grasped by the above description. The following will be described about an exemplary configuration of the charging circuit 414.

FIGS. 6A to 6D are circuit diagrams showing exemplary configurations of the charging circuit 414. The charging circuit 414 of FIG. 6A includes a charge controller 418, a first current source 420, and a second current source 422.

The charging circuit 414 is capable of switching between a first state for supplying a first current amount I1 and a second state for supplying a second current amount I2.

The first current source 420 normally supplies the battery 450 with the first current amount I1 which is adjusted by the charge controller 418. In response to the modulated signal from the modulator 408, the second current source 422 may supply the differential current AI between the first current amount I1 and the second current amount I2 to be capable of being in an on state or off state according to the modulated signal from the modulator 408 (i.e., data S3). The on/off state of the second current source 422, for example, may be controlled by a switch SW11 provided on a path of a current. As such, the charging current $I_{CHG}$ is switched between two values of I1 and I2 (i.e., I2=I1+ΔI).

The differential current (referred to as a modulated current) ΔI, which the second current source 422 generates, may be adjusted in proportion to the first current amount I1 or may be a fixed current.

Figure 6A:
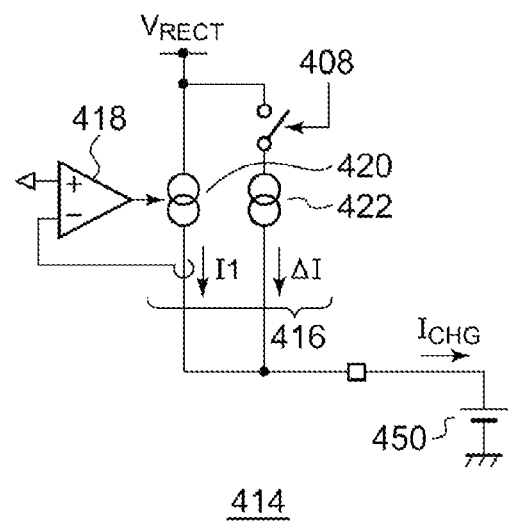
FIGS. 6A to 6D are circuit diagrams showing exemplary configurations of a charging circuit.
Figure 6B:
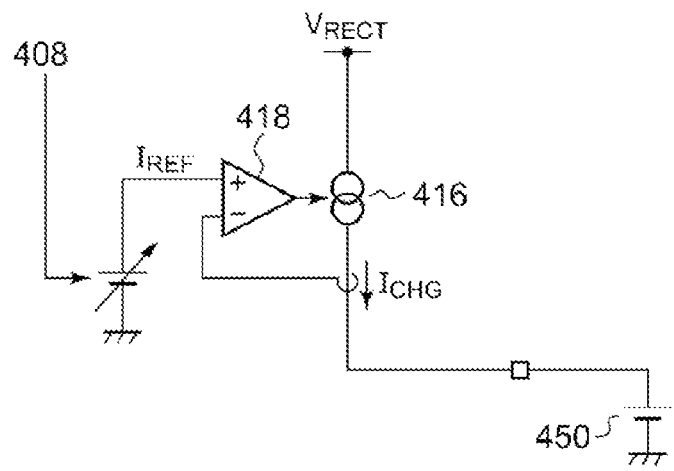

In the charging circuit 414 of FIG. 6B, the target current $I_{REF}$ of the charging current $I_{CHG}$ is modulated based on the modulated signal (data S3) from the modulator 408. The charge controller 418 performs a feedback control so that the charging current $I_{CHG}$ may come close to the modified target current $I_{REF}$.

Figure 6C:
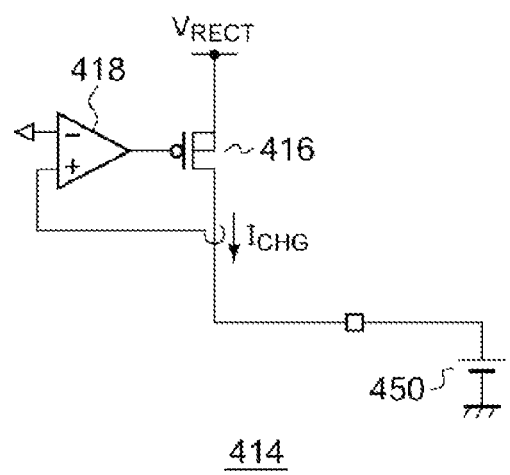
Figure 6D:
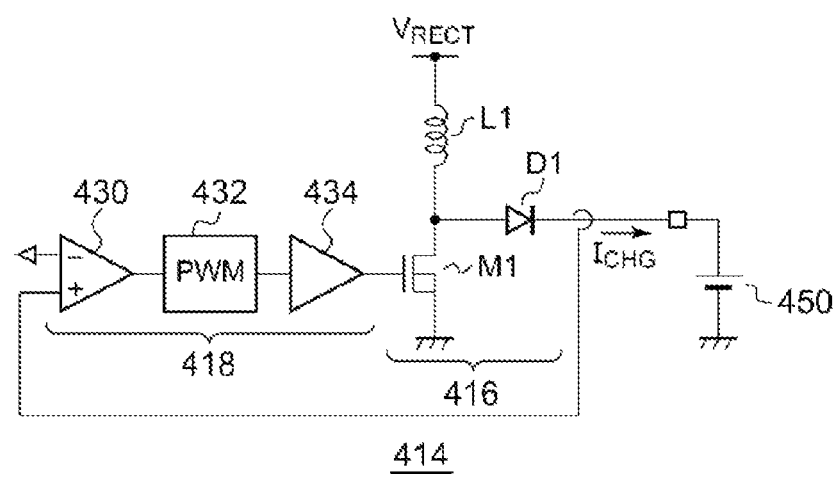

In FIGS. 6C and 6D, the exemplary configuration of the power source 416 is specifically disclosed. The power source 416 of FIG. 6C may be a linear power supply and include a MOSFET or bipolar transistor. The charge controller 418 is an error amplifier. In the CC mode, the charge controller 418 adjusts the gate/base voltage of the transistor so that the detected value of the charging current $I_{CHG}$ may come close to a target value. In the CV mode, the charge controller 418 adjusts the gate/base voltage of the transistor so that the detected value of the battery voltage $V_{BAT}$ may come close to a target value.

The power source 416 of FIG. 6D may be a switching power supply and include a transistor M1, which is a switching element, an inductor L1, and a rectifier element D1. The charge controller 418 includes an error amplifier 430, a pulse modulator 432, and a driver 434. In the CC mode, the error amplifier 430 amplifies an error between the detected value of the charging current $I_{CHG}$ and the target value. In the CV mode, the error amplifier 430 amplifies an error between the detected value of the battery voltage $V_{BAT}$ and the target value. The pulse modulator 432 receives an error signal from the error amplifier 430 and generates a pulse signal having a duty cycle based on the error signal. The driver 434 switches the switching transistor M1 based on a pulse signal generated by the pulse modulator 432. In addition, the power storage device 450 as described herein may be a secondary battery, which is a multi-cell battery. The power storage device 450 may be represented as a step-up DC/DC converter if $V_{RECT}<V_{BAT}$ or may be used as a step-down DC/DC converter if $V_{RECT}>V_{BAT}$.

The present disclosure has been described above by way of embodiments. The disclosed embodiments are illustrative only. It should be understood by those skilled in the art that various modifications to combinations of elements or processes may be made and such modifications fall within the scope of the present disclosure. Some exemplary modifications will be described below.

First Modification

The linear regulator (LDO: Low Drop Output), which stabilizes the rectified voltage $V_{RECT}$ and supply the charging circuit 414 with the rectified voltage VRECT, may be inserted between the rectifier circuit 404 and charging circuit 414. Speaking from different points of view, it may be understood that the linear regulator is included in the charging circuit 414. Specifically, the power source 416 may include a linear regulator and a current source which receives the output voltage of the linear regulator and operates.

Second Modification

Figure 7:
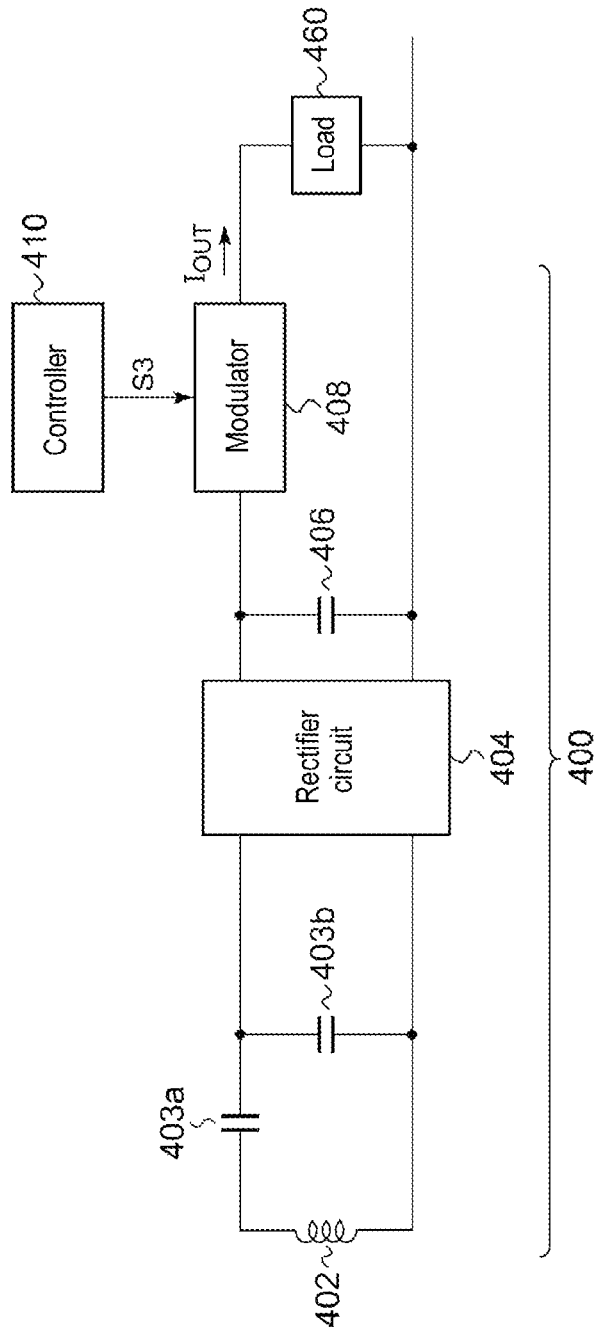
FIG. 7 is a circuit diagram of a power receiving device according to a first modification of the present disclosure.

In the embodiments, even though it has been illustrated with respect to modulating the current of the charging circuit 414 for charging the power storage device 450, the present disclosure is not limited thereto. FIG. 7 is a circuit diagram of a power receiving device 400 according to a first modification of the present disclosure. The modulator 408 is provided on a path of current $I_{OUT}$ flowing from the rectifier circuit 404 into the load 460. The load 460, in addition to the power storage device 450, may include a microcomputer, a processor, a power circuit, etc. The modulator 408 modulates the voltage or current of the receiving antenna 401 by changing current $I_{OUT}$ based on data S3 from the controller 410. According to this, it is possible to obtain the same effect as in FIG. 4.

More specifically, when a linear regulator is inserted between the rectifier circuit 404 and the charging circuit 414 in a similar manner to the first modification of the present disclosure, an output current of the linear regulator may be modulated instead of modulating the charging current $I_{CHG}$ of the charging circuit 414.

Third Modification

In the embodiments, although it has been illustrated with respect to the wireless power transmitting device according to the Qi standard, the present disclosure is not limited thereto. The present disclosure can be applied to the power receiving device 400 for use in a system similar to Qi standard or power receiving device 400 according to other standards that will be developed in the future.

According to certain embodiments of the present disclosure, there is provided a wireless power receiving device to obtain a stable degree of modulation without depending on the frequency and/or limit a decrease in efficiency since the charging current is recovered to the battery. Also, there is provided a wireless power receiving device to obtain a stable degree of modulation without depending on the frequency and/or limit a decrease in efficiency since the variation component of the current is supplied to the load without loss.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A wireless power receiving device, comprising:
a receiving antenna;
a rectifier circuit connected to the receiving antenna, that generates a rectified voltage;
a charging circuit to receive the rectified voltage and charge a power storage device; and
a modulator that modulates a voltage or current of the receiving antenna by changing a charging current of the charging circuit based on data to be transmitted to a wireless power transmitting device,
wherein the charging circuit allows the charging current to be switched between a first current amount and a second current amount, and
wherein the charging circuit includes:
a first current source configured to continuously supply the first current amount to the power storage device during an operation time of the charging circuit; and
a second current source configured to supply an additive current amount, which is a differential current between the first current amount and the second current amount, to the power storage device in an on-off manner according to the data.

2. A wireless power receiving device comprising:
a receiving antenna;
a rectifier circuit connected to the receiving antenna, that generates a rectified voltage; and
a modulator that is provided on a path of a current flowing from the rectifier circuit into a load and modulates a voltage or current of the receiving antenna by changing the current flowing into the load based on data to be transmitted to a wireless power transmitting device,
wherein the modulator is configured to:
allow the current flowing into the load to be switched between a first current amount and a second current amount;
control a first current source that continuously supplies the first current amount to the load during an operation time of the modulator; and
control a second current source that supplies an additive current amount, which is a differential current between the first current amount and the second current amount, to the load according in an on-off manner to the data.

3. A receiver circuit for use in a wireless power receiving device together with a receiving antenna comprising:
a rectifier circuit connected to the receiving antenna, that generates a rectified voltage;
a charging circuit to receive the rectified voltage and charge a power storage device; and
a modulator that modulates a voltage or current of the receiving antenna by changing a charging current of the charging circuit based on data to be transmitted to a wireless power transmitting device,
wherein the charging circuit allows the charging current to be switched between a first current amount and a second current amount, and
wherein the charging circuit includes:
a first current source configured to continuously supply the first current amount to the power storage device during an operation time of the charging circuit; and
a second current source configured to supply an additive current amount, which is a differential current between the first current amount and the second current amount, to the power storage device in an on-off manner according to the data.

4. The receiver circuit of claim 3, wherein the receiver circuit is integrated on a single semiconductor substrate.

5. A receiver circuit for use in a wireless power receiving device together with a receiving antenna comprising:
a rectifier circuit connected to the receiving antenna, that generates a rectified voltage; and
a modulator that is provided on a path of a current flowing from the rectifier circuit into a load and modulates a voltage or current of the receiving antenna by changing the current flowing into the load based on data to be transmitted to a wireless power transmitting device,
wherein the modulator is configured to:
allow the current flowing into the load to be switched between a first current amount and a second current amount;
control a first current source that continuously supplies the first current amount to the load during an operation time of the modulator; and
control a second current source that supplies an additive current amount, which is a differential current between the first current amount and the second current amount, to the load in an on-off manner according to the data.

6. A control method of a wireless power receiving device comprising:
receiving a power signal at a receiving antenna,
rectifying a current induced in the receiving antenna and generating a rectified voltage,
charging a power storage device based on the rectified voltage,
modulating a voltage or current of the receiving antenna by changing a charging current for the power storage device based on data to be transmitted to a wireless power transmitting device, and transmitting the data to the wireless power transmitting device,
wherein changing the charging current includes switching the charging current between a first current amount and a second current amount by:
continuously supplying the first current amount to the power storage device during the act of charging the power storage device; and
supplying an additive current amount, which is a differential current between the first current amount and the second current amount, to the power storage device in an on-off manner according to the data.

* * * * *